United States Patent [19]
Houben et al.

[11] Patent Number: 6,013,325
[45] Date of Patent: Jan. 11, 2000

[54] PRINTABLE ONE-COMPONENT SWELLING PASTE AND THE USE THEREOF

[75] Inventors: Jochen Houben, Kempen; Oliver Hoppe, Krefeld; Daniel Roulands, Kempen, all of Germany

[73] Assignee: Stockhausen GmbH & Co. KG, Krefeld, Germany

[21] Appl. No.: 08/991,782

[22] Filed: Dec. 16, 1997

[30] Foreign Application Priority Data

Apr. 24, 1997 [DE] Germany .......................... 197 17 394

[51] Int. Cl.⁷ ...................................................... B05D 3/02
[52] U.S. Cl. ...................... 427/389.9; 524/522; 524/555; 525/329.4
[58] Field of Search ................... 427/288, 385.5, 427/389.9; 524/522, 555; 525/329.4

[56] References Cited

U.S. PATENT DOCUMENTS

| | | | |
|---|---|---|---|
| 4,585,820 | 4/1986 | Defago et al. | 524/232 |
| 4,762,875 | 8/1988 | Gold . | |
| 4,880,868 | 11/1989 | Le-Khac . | |

FOREIGN PATENT DOCUMENTS

| | | |
|---|---|---|
| 0 454 497 | 10/1991 | European Pat. Off. . |
| 31 24 008 | 1/1983 | Germany . |
| 40 13 222 | 10/1990 | Germany . |
| 40 16 338 | 11/1990 | Germany . |
| 42 15 177 | 11/1993 | Germany . |
| 43 27 784 | 2/1995 | Germany . |
| 195 06 634 | 8/1996 | Germany . |
| 195 21 431 | 12/1996 | Germany . |
| 195 24 724 | 1/1997 | Germany . |
| WO 90/15825 | 12/1990 | WIPO . |
| WO 94/09043 | 4/1994 | WIPO . |

OTHER PUBLICATIONS

Patent Abstracts of Japan, vol. 14, No. 363, AN 90–132103, JP 02132103, May 21, 1990.

*Primary Examiner*—Erma Cameron
*Attorney, Agent, or Firm*—Oblon, Spivak, McClelland, Maier & Neustadt, P.C.

[57] ABSTRACT

The invention relates to a printable one-component swelling paste made of an aqueous mixture of a water-soluble polymer containing carboxyl groups, and at least one multifunctional alcohol as crosslinker and optionally further additives such as thickeners, the carboxyl groups of the polymer being neutralized to 40–65 mole-%. The invention also relates to the use of the swelling paste for producing water-swellable yarns, fabrics, nonwovens, or films. After coating the swelling paste on a support, a thermal subsequent treatment is effected for the purpose of drying and crosslinking the swelling paste.

20 Claims, No Drawings

PRINTABLE ONE-COMPONENT SWELLING PASTE AND THE USE THEREOF

The present invention relates to a printable swelling paste comprising a mixture of polymers containing carboxyl groups and a crosslinker containing polyhydroxyl groups. The swelling paste is suitable for coating support materials such as fibers, fleeces, fabrics, and films and is crosslinked thereon under temperature influence to yield a polymer which absorbs aqueous liquids. The swelling paste is remarkable for its high storage stability and exhibits extraordinarily high swelling properties in the crosslinked state.

Superabsorbent polymers are known for a long time and commercially available in the form of powders, e.g., under the designation of FAVOR or CABLOC. However, the processing of powders is technically expensive and, once abraded particles give rise to breathable fines, not harmless in terms of occupational medicine.

It is already well-known to perform the polymerizations of monomer solutions on prefabricated surfaces or filaments. However, these processes are a domain of chemical industry factories because of the protective gas technique required and the safety regulations to be observed and cannot be transferred to factories of other industrial sectors such as the printing and textile industries.

The teaching of EP 482,703 wherein a water-in-oil emulsion of a superabsorbent material is applied onto aramide fibers and the liquid components are subsequently evaporated by heat, neither offers an optimum solution because in this case, the complete oil phase is transferred into the exhaust air and therefore, expensive exhaust air purification procedures must be performed.

EP 188,091 describes absorptive porous sheet materials produced by padding a mixture of an aqueous solution of a non-crosslinked prepolymer with a crosslinker onto a fleece and subsequent thermal crosslinking. This process is disadvantageous in that the polyhaloalkanol, haloepcxyalkane and polyglycidyl ether type crosslinkers may be added just a short time before processing due to their reactivity, because otherwise undesirable thickening of the mixture takes place already during storage, and the above-described crosslinkers are highly critical for health reasons.

EP 357,474 describes spraying of low-viscosity aqueous solutions of non-crosslinked polyacrylic acids on sheet fabrics made of cellulose and subsequent thermal crosslinking by simultaneously applied crosslinkers to give water-swellable gels. Multivalent metal ions, as well as epoxides, aziridines, polyglycidyl ethers are described as crosslinkers which, due to their cancerogenic potential, are barely usable anymore, the hygienics and food packaging industrial sectors being considered as particularly problematic. In addition, when storing the coating solutions, they give rise to early crosslinking already at room temperature, so that further processing of the highly viscous and/or gelled mass is no longer possible.

The EP 361,842 describes the production of absorbent sheet materials using fibers of copolymers containing carboxyl groups, which are crosslinked with heterocyclic carbonates or compounds having at least two free hydroxyl groups. The copolymers consist of from 25 to 75 mole-% of monomers having carboxyl groups and from 75 to 25 mole-% of other monomers, the carboxyl groups being neutralized to a degree of from 20 to 80%. Maleic acid (anhydride) type dicarboxylic acids(anhydrides) are mentioned as typical unsaturated carboxylate monomers, which are copolymerized with hydrophobic comonomers such as isobutylene, ethylene and styrene. The embodiments are confined to a maleic anhydride/isobutylene copolymer. However, the water-absorbing fibers thus produced are disadvantageous in that they are highly brittle and fragile at low humidity, tend to be tacky and deliquescent at high humidity, and have low swelling values. For this reason, these delicate structures are not processed alone but only in combination with a supporting fabric. However, for many applications such as in the cable industry or as back sheet in the hygienics industry, such fabric/filament combinations are excessively thick and thus, unsuitable.

DE 195 21 431 A1 describes a process wherein reactive crosslinkers such as polyfunctional epoxides, aziridines, polyglycidyl ethers, and epihalohydrines are added to an aqueous solution of a pre-crosslinked polyacrylic acid just prior to the printing process. Although, an already printable paste is described therein, these reactive crosslinkers have the crucial disadvantage that most of them are highly critical in toxicological terms and therefore, are processed only reluctantly in the printing industry or under stringent provisions affecting process economy. Another drawback of this system is that the mixture of the two components cannot be stored for long but must be prepared freshly again and again due to thickening which already begins at room temperature. The application cited above illustrates and exemplifies that less reactive components such as substances having free alcohol or amino functions are unsuitable as crosslinkers for polyacrylic acids.

U.S. Pat. No. 4,017,653 describes a process for the production of an absorbing article coated with a water-swellable polyelectrolyte, coating being effected using a solution of the polymer and crosslinker in alcohol and/or water. Crosslinkers used therein are those from the group of haloalkanols, haloepoxide compounds, polyglycidyl compounds and sulfonium zwitterions. Considering ecological and health-related aspects, the crosslinkers must be rated critical, their crosslinking activity being high to a extent that even at low crosslinker concentrations, gelling of the coating solution takes place within 2 days, rendering further processing impossible.

WO 96/23024 claims substrates coated with a mixture of polymer and crosslinker, which are crosslinked by heat and exhibit superabsorbent properties. There is only one, yet incomplete theoretical example, wherein a combination of a pre-crosslinked poly(meth)acrylic acid and an unspecified bivalent crosslinker is mentioned. Neither are there detailed statements concerning the properties of the polymer/crosslinker mixtures and the chemistry of the crosslinker, nor the conditions of crosslinking.

Therefore, the invention is based on the object of providing an aqueous, processable paste which already includes a crosslinker and nevertheless, may be stored for a prolonged period of time, with no increase in viscosity taking place during storage that would impede processing. The term printable is understood to indicate that further additives in the paste prior to coating on a prefabricated sheet material are not absolutely necessary in order to provide the desired properties after a thermal subsequent treatment, i.e., to swell in the presence of water or aqueous solutions, thereby increasing the original volume by a multiple. Thus, swelling as demanded by the cable industry should be at least 8 mm, preferably 10 mm, and particularly preferred, at least 12 mm with a dry substance coating of 100 g per m$^2$. To ensure sufficient gel stability, the retention should have values of at least 15 g per g of polymer, preferably at least 25 g/g, and more preferably at least 40 g/g since otherwise, it must be assumed that the swelling height determined in a short-term test will decrease again on prolonged contact with water.

Further, the paste must be free of highly inflammable or hazardous substances and should have a viscosity behavior at room temperature, which is desirable for a printing medium. At the same time, stringing should be as low as possible. In particular, the crosslinkers should not contain substances which are hazardous to health, such as epoxides, halohydrines and other halogen compounds. Crosslinking should be possible at temperatures of from 150° C. to 250° C., wherein crosslinking periods of a few minutes are demanded due to the thermal loadability of the base material and for economical reasons. It is particularly preferred that crosslinking be complete after five minutes at a temperature of 180° C. or after one minute at 200° C. Thereafter, the imprinted sheet material must be capable of being rolled without sticking and should virtually be free of substances capable of migrating.

Surprisingly, the object of the invention was accomplished using a combination of a water-soluble polymer containing carboxyl groups (preferably, partially neutralized polyacrylic acid) and at least one multifunctional alcohol in aqueous solution, where the aqueous mixture of carboxyl group-containing polymer and multifunctional alcohol may optionally contain further additives. Here, alkoxylated multifunctional alcohols were found to be particularly favorable. Hereinbelow, multifunctional alcohols are understood to be alkoxylation products as well, particularly the ethoxylation products of amines and aminoalcohols, which contain at least 2 OH groups.

More specifically, the ethoxylates of ethylene glycol having a molecular weight of from 200 to 1,000, as well as glycerol, trimethylolpropane, butanediol, pentaerythritol, and sorbitol may be mentioned, for example. Furthermore, ethoxylates of ethylenediamine, diethylenetriamine or ethanolamine, diethanolamine or triethanolamine are possible. Also, condensation products of ethanolamines with polycarboxylic acids such as succinic acid or adipic acid may be used as crosslinkers. Surprisingly, the ethoxylated crosslinkers are more effective compared to the non-ethoxylated base molecules and are preferred for this reason. Preferably, the number of OH moieties in the ethoxylate chains should not exceed a value of 10.

Thus, the invention is directed to a swelling paste made of an aqueous mixture of a water-soluble polymer containing carboxyl groups and at least one multifunctional alcohol and optionally further additives, which is characterized in that the carboxyl groups of the water-soluble polymer are neutralized to 40–65 mole-%, and the multifunctional alcohol serving as crosslinker is present at a concentration of from 0.5 to 30 wt.-%, based on the weight of water-soluble, carboxyl group-containing polymer employed.

Surprisingly, it was found that in order to accomplish the object of the invention, the carboxyl groups of the carboxyl group-containing polymer used, preferably polyacrylic acid, must be present as salt to an extent of from 40 to 65 mole-%, preferably from 45 to 60 mole-%. The salts are formed using univalent cations such as potassium, sodium, ammonium and alkylammonium. If the neutralization degree is above the limits according to the invention, only slight crosslinking results under the conditions indicated. With a product thus produced, an excessively soft gel is formed which is actually capable of absorbing water but does not permit a swelling height to be determined. If the neutralization degree is less than 40 mole-%, crosslinking does actually occur, but swelling of the obtained crosslinked polymerizate upon contact with aqueous solutions takes place to only a minor extent and above all, very slowly.

Particularly suitable as multifunctional alcohols with crosslinking effect are the members of the group selected from ethylene glycol, 1,3-propylene glycol, glycerol, 1,4-butanediol, trimethylolpropane, erythritol, pentaerythritol, and hydrogenated sugars. The multifunctional alcohols may be employed alone or as mixtures of each other.

The alkoxylation products of said multifunctional alcohols, i.e., the addition products of alkylene oxides, preferably ethylene oxide with these multifunctional alcohols, were found to be particularly suited. More specifically, the ethoxylates of ethylene glycol, as well as those of glycerol, trimethylolpropane, 1,4-butanediol, pentaerythritol and/or sorbitol are to be mentioned, for example, these ethoxylates preferably having a molecular weight of from 200 to 1,000. Where the ethoxylates of the multifunctional alcohols are employed as crosslinkers, they have at least 1 mol ethylene oxide per mol of alcohol, preferably at least 1 mol ethylene oxide per mol of OH group.

The mixtures of polymer and crosslinker according to the invention may be stored for a long period of time, with properties not being lost. In particular, they have excellent viscosity stability, permitting prefabrication of ready-to-use swelling pastes and relieving the end user from the necessity of mixing the pastes with crosslinkers.

For economical and technical reasons, the polymer content of the aqueous solutions is at least 10, but preferably more than 30 wt.-%; however, higher concentrations may be realized as well, depending on the particular use.

The ratio of crosslinkers employed depends on the molecular weight and functionality and normally ranges between 0.5 and 30 wt.-%, preferably between 1 and 20 wt.-% and particularly preferred, between 1 and 15 wt.-%, biased on the polymer ratio in the swelling paste. Due to its excellent stability, the mixture may be stored as such or marketed, or may be prepared as late as by the processing user, the crosslinker concentration being adjusted to the desired product properties, such as swelling rate, swelling height and gel stability. As a result of its storage stability, it is possible that the prepared paste is stored by the processing user for a prolonged period of time, and to run several operations with same.

As carboxyl group-containing monomers, methacrylic acid, maleic anhydride, fumaric acid, itaconic acid and the salts and mixtures of these monomers are possible in addition to acrylic acid. However, acrylic acid and/or sodium acrylate are preferably used.

Use of other comonomers, as well as slight crosslinking is possible, but here, the monomers containing carboxyl groups are preferably present with more than 50 mole-%, more preferably more than 75 mole-%. In case a pre-crosslinker is to be used in polymer production, it must be ensured that the polymer may still be processed in the form of an aqueous solution and is not present merely in the form of swelled gel portions due to excessively high crosslinking, which cannot be processed in a swelling paste anymore. Therefore, the primary crosslinker is normally used with 0.1 mole-% at maximum.

For example, though not exclusively, (meth)acrylamide, vinyl acetate, vinylsulfonic acid and the salts thereof, 2-acrylamido-2-methylpropanesulfonic acid and the salts thereof, (meth)allyl alcohol and the alkoxylation products thereof, as well as mono(meth)acrylic esters of multivalent alcohols or of univalent alcohol alkoxylates are to be mentioned as monomers not containing carboxyl groups, which are employed in the polymer with 40 mole-% at maximum in case of hydrophilic monomers, and with 20 mole-% at maximum in case of hydrophobic monomers. The comonomers are used to modify the polymer properties, e.g., to improve adherence to the support material. Co-use of vinyl or (meth)acrylate esters as comonomers is advantageous in flexibilizing films which may be produced from the swelling pastes of the invention. For example, using monomers containing sulfonate or sulfonic acid, an improved salt stability may be achieved when using the crosslinked swelling paste. Among these monomers, the group consisting of acrylamide, methacrylamide, hydroxyethyl acrylate, allylsulfonic acid, methallylsulfonic acid, acrylamidopropanesulfonic acid and mixtures of these monomers is preferred.

The aqueous polyacrylic acid may contain further additives having advantageous effects, which are not polymerized therein. In particular, substances for reducing the brittleness (hardness) of the dried product, those for tack reduction, for improving the printing viscosity, and for increasing the conductivity are possible. Thus, in order to improve the gel stability and to adjust the desired printing viscosity, common thickeners effective in water, such as cellulose derivatives or more highly crosslinked polyacrylates, e.g., those sold by the Stockhausen company under the designation of "Cabloc CTF" may be added. They do not swell in the polyacrylate solution as usual, yet improve significantly the viscosity behavior during the printing process. The additives are present with usual amounts, advantageously not more than 30 wt.-%, particularly not more than 20, and more preferably not more than 10 wt.-%, based on swelling paste.

The swelling paste of the invention is preferred to have a viscosity of at least 800 mPa•s, preferably at least 2,000 mPa•s and 25,000 mPa•s at maximum, preferably 20,000 mPa•s at maximum, determined using a 30 wt.-% aqueous solution of polymer employed.

The swelling paste thus produced may be applied on a prefabricated sheet material or on filaments according to well-known methods. Here, imprinting or knife coating on fabrics or nonwovens using a template is preferably chosen in order to achieve a uniform pattern with regular spacings between the single paste spots. Furthermore, it is possible to soak a nonwoven with this paste in a padder and subsequently squeeze it off to the desired liquid content. The swelling paste may be applied onto yarns as described in EP 482,703, for example.

Instead of a fabric, a film may also be printed with the swelling paste on one side, in which case it is advantageous for adherence of the paste spots when the side of the film to be printed has been roughened using suitable means, or laminated with a thin fleece. Films printed in this fashion may be used with particular advantage in those cases where it is important that the water barrier layer is not rendered excessively thick, as is the case with communication cables, for example. There are a number of organic film materials which resist the temperature load during the printing and crosslinking operations, such as, though not exclusively, polyimide, polysulfonic, polycarbonate, polyethylene terephthalate and polytetrafluoroethylene films. Likewise, metallic or metallized films are used.

Subsequently, the polymer thus coated must be subjected to crosslinking, which may be achieved by a short-term thermal treatment, the duration of the thermal treatment depending on the temperature and the neutralization degree of the polymer-bound carboxyl functions and the temperature stability of the support material. In any event, the crosslinking temperature must be below the shrinking temperature of the support being in the form of, e.g., fabric/nonwoven filaments or a film. With sheet materials, it is commonly between 150° C. and 250° C., preferably between 180 and 200° C. For economical reasons, the available time for crosslinking is generally less than 5 minutes, preferably less than 2 minutes. Here, it is possible to perform drying and crosslinking at a constant temperature or to select a temperature program to allow steps such as drying and crosslinking to be run at various temperatures. Also, a short-term subsequent heating, using an IR radiator, may be advantageous.

After drying and crosslinking post-cure, the swelling paste of the invention advantageously has a swelling height per 100 g of at least 8 mm, preferably at least 10 mm, and more preferably at least 12 mm, and in addition, has a retention of at least 15 g/g dry weight, preferably at least 25 g/g, and more preferably at least 40 g/g dry weight.

Also, fibers having high thermal stability, such as aramide fibers or glass fibers may be impregnated with the swelling paste of the invention and subsequently subjected to a thermal treatment. Because these fibers have significantly higher thermal stability compared to fabrics or fleeces, but residence times of only a few seconds are economically feasible, temperatures of up to 400° C. are applied in this case.

Mostly, the production of support-free films is effected on a reusable intermediate support, from which the film is removed after crosslinking and optional conditioning. As to the molecular polymer structure, care must be taken that film flexibility sufficient for further use is achieved by using comonomers, if necessary.

The finished substrate may find use in various industrial fields, such as the cable industry, the hygienics industry, in food packaging, in landscaping applications, in the clothing industry, or even in the burial business.

In order to test the swelling paste for two-dimensional fabrics, it was knife-coated on a polyester fabric on a comber table using a template and subsequently dried in a circulating air oven. A uniform pattern of spots was constantly obtained.

Application-technical measurements:

Measurement of swelling height and swelling rate

To measure the swelling height and the swelling rate, a circular piece (25.4 $cm^2$) of the coated sheet material is placed in a plastic beaker having an inner diameter of 80.5 mm and a height of 30 mm. First, a thin polyester fleece (0.5 mm in thickness) and then a round piston having a diameter of 80 mm and a weight of 100 g are placed on top of the above fleece. The piston has 60 through borings of 2 mm diameter each. During measurement, the level of the piston upper edge is observed, using an instrument by the Mitutoyo company (IDU 25). 75 ml of VE water (<5 $\mu S$) is placed in the beaker, and the rise of the piston upper edge after 30 seconds, 1 and 10 minutes is recorded (double determination). For better comparison of the swelling heights with various coatings, the swelling height measured after ten minutes is divided by the dry coating per $m^2$ and multiplied by 100 in order to obtain integral values.

Fiber tightness test

The test has been described in EP 482,703 page 4, lines 50ff.

Determination of retention

In order to determine the retention, a circular piece of the imprinted fabric having a diameter of 3 cm is welded in a commercially available tea bag. The bag is then immersed in a dish with distilled water for thirty minutes, suspended for 10 minutes and centrifuged at 1,200 rpm in a commercially available spin dryer for 5 minutes. The weight of the centrifuged tea bag is determined. To estimate the retention, the weight of the dry tea bag including the fabric is subtracted from the weight of the centrifuged tea bag and divided by the weight of printed polymer.

EXAMPLES

Example 1

A polyacrylic acid having a neutralization degree of 50% (counterion: sodium), a product viscosity (TS 32% in water) of 12,300 mPa•s, measured at room temperature using a Brookfield viscosimeter, and a molecular weight Mp of 120,000 g/mol and an Mw of 155,000 g/mol (determined by means of GPC against polyacrylic acid standard), and a ratio of polymers having a molecular weight of below 10,000 g/mol of less than 5 wt.-% was used for the printing test. This polyacrylic acid was mixed with 3 wt.-% of Imbetin SOR/060 (a 6EO sorbitol manufactured by Kolb AG) and 3.5 wt.-% of Cabloc CTF and subsequently printed on a polyester fabric using a perforated template. The imprinted fabric was heated at 190° C. for 2 minutes in a drying oven. The product had a coating of 16.5 g/m$^2$ 2 and a swelling height of 2.38 mm after 30 seconds, 2.6 mm after 1 minute, and 2.8 mm after 10 minutes. Accordingly, the 10 minute value per 100 g dry coating was 17 mm/100 g. The retention was 49.5 g/g of dry coating.

Example 2

The procedure was as in Example 1, but instead of pure polyacrylic acid, a copolymer of 95 mole-% acrylic acid and 5 mole-% acrylamide was used. 50 mole-% of the acrylic acid functions in this polymer were present as sodium salt. At a dry substance of 31.5% at room temperature, this polymer had a viscosity of 10,700 mPa•s (determined using a Brookfield rotary viscosimeter). According to GPC (comparison with polyacrylic acid standard), this polymer had an Mp of 160,000 g/mol and an Mw of 200,000 g/mol. The ratio of homologues having a molecular weight below 10,000 g/mol was less than 3%. The product obtained after drying had a dry coating of 18 g/m$^2$ and a swelling height of 1.71 mm after 1 minute, and 1.82 mm after 10 minutes. Thus, the 10 minute value per 100 g of coating was 10 mm/100 g. The retention was 31.4 g/g.

Example 3

The procedure was as in Example 1, but instead of pure polyacrylic acid, a terpolymer of 94 mole-% acrylic acid, 5 mole-% acrylamide and 1 mole-% methoxypolyethylene glycol(1,000) methacrylate (Bisomer S 10W) was used. 50% of the acrylic acid in the polymer were present as sodium salt. The polymer had a viscosity of 2,180 mPa•s (determined using a Brookfield rotary viscosimeter at a TS of 30%). At a dry coating of 17 g/m$^2$, a swelling height of 1.94 mm was determined after 1 minute, and of 2.36 mm after 10 minutes. Thus, the 10 minute value per 100 g of coating was 13.9 mm/100 g. The retention was determined to be 68.5 g/g.

Example 4

The procedure was as in Example 1, except that the fabric was heated at 185° C. for only 2 minutes in a Matthis dryer and subsequently for 8 seconds under a IR lamp. The product had a dry coating of 19 g/m$^2$ and a swelling height of 2.2 mm after 30 seconds, 2.3 mm after 1 minute, and 2.5 mm after 10 minutes. Thus, the 10 minute value per 100 g of dry coating was 13 mm/100 g. The retention was 54 g/g of dry coating.

Example 5

The procedure was as in Example 1, except that Cabloc CTF was omitted. The final mixture of polyacrylic acid and 3 wt.-% of Imbetin SOR/060 had a viscosity of 10,300 mPa•s. The product had a dry coating of 17.1 g/m$^2$ and a swelling height of 2.11 mm after 30 seconds, 2.18 mm after 1 minute, and 2.21 mm after 10 minutes. Thus, the 10 minute value per 100 g of dry coating was 13 mm/100 g. The retention was 28 g/g of dry coating.

Example 6

The procedure was as in Example 1, but instead of Imbetin SOR/060, 3.3 wt.-% of an addition product of four moles ethylene oxide to trimethylolpropane was employed. The imprinted fabric was heated for 2 minutes at 200° C. in a drying oven. The product had a dry coating of 16.3 g/m$^2$ and a swelling height of 1.26 mm after 30 seconds, 1.59 mm after one minute, and 1.85 mm after 10 minutes. Thus, the 10 minute value per 100 g of dry coating was 11.3 mm/100 g. The retention was 36 g/g of dry coating.

Example 7

The polymer of Example 1 was diluted 1:1 with distilled water, resulting in a solution having a Brookfield viscosity of 240 mPa•s. This solution was mixed with 1.5 wt.-% of Imbetin SOR/060 and subsequently applied onto aramide fibers. The aramide fibers thus treated were subjected to a short thermal treatment using a hot-air hairdryer. The treated aramide fibers were subjected to a swelling test as described in EP 482,703, page 5, from line 50 on, thereby obtaining fibers having a polymer coating of 15 wt.-%. These coated fibers were immediately tight in the swelling test and maintained tightness until the end of testing after 6 days.

Example 8

The polymer of Example 1 was mixed with 5 wt.-% of a 20EO triethanolamine and coated without Cabloc on a polyester fabric using a perforated template and a comber. The coated fabric was dried at 200° C. for 3 minutes and subsequently heated for 12 seconds using an IR lamp. The product had a dry coating of 22 g/m$^2$ and a swelling height of 2.0 mm after 30 seconds, 2.4 mm after 1 minute, and 2.6 mm after 10 minutes. Thus, the 10 minute swelling height value was 11.8 mm/100 g of dry coating. The retention was 44 g/g of dry coating.

Example 9

The polymer of Example 1 was diluted 1:0.75 with distilled water and following addition of 3 wt.-% of Imbetin SOR/060, coated on a polyester fleece (weight per unit area: 100 g/m$^2$) in a padder, using a flow rate of 2.4 m/min. Supernatant liquid was squeezed off between two rubber rollers, using a pressure of 2 bars. Thereafter, the wet fleece was dried at 185° C. for five minutes. A fleece having a polymer coating of 23.9 g/m$^2$ was obtained. The solid absorption and centrifuge retention after an immersion period of 30 minutes were determined for this fleece (described in DE 41 38 408, page 7, lines 43ff for an immersion period of 10 minutes). Solid absorption: 26.9 g/g of polymer; retention: 8.3 g/g of dry coating.

Example 10

The procedure was as in Example 1, with the exception that a different polyacrylic was used. This was a polyacrylic acid which was present to 50% as sodium salt, had a viscosity of 900 mPa•s at a TS of 32 wt.-% (measured at room temperature using a Brookfield rotary viscosimeter), and an Mp of 15,000 g/mol and an Mw of 39,500 g/mol (measured using GPC against polyacrylic acid standard), and wherein 30 wt.-% of the molecular weight proportions were below 10,000 g/mol. The swelling height after 10 minutes was 1.65 mm at a coating of 14 g/m². This corresponds to a 10 minute swelling height per 100 g of coating of 11.8 mm. The retention was 11.2 g/g.

Example 11

A polymerizate as described in Example 1, but having a neutralization degree of 45 mole-% and a viscosity of 14,800 mPa•s at 31% TS, was stirred with 3 wt.-% of Imbetin SOR/06, printed, and crosslinked for 2 minutes at 190° C. Retention: 14 g/g, swelling height after 10 minutes: 1.6 mm, dry coating 18 g/m², swelling height per 100 g: 8.9 mm.

Example 12

The procedure was as in Example 1, except that the polymerizate had a neutralization degree of 55 mole-%, a viscosity of 14,900 mPa•s, and a TS of 30%. Retention: 59 g/g, swelling height after 10 minutes: 2.0 mm, dry coating: 19.5 g/m², swelling height per 100 g: 10.3 mm.

Example 13

A swelling paste was produced using a 30 wt.-% aqueous solution of a copolymerizate of 30 mole-% acrylic acid, 30 mole-% sodium acrylate and 40 mole-% acrylamide and a viscosity of 7,800 mPa•s, and 2 wt.-% 1,4-butanediol. After coating on a polyester fabric and crosslinking for two minutes at 190° C., the dry coating was 10.2 g/m². The product had a retention of 36.6 g/g, a swelling height after 10 minutes of 1.1 mm, and a swelling height per 100 g of 10.8 mm.

Example 14

The procedure was as in Example 13, but the polymer consisted of 20 mole-% acrylic acid, 20 mole-% sodium acrylate and 60 mole-% acrylamide, and had a viscosity of 14,460 mPa•s at 27% TS. The properties were as follows: dry coating: 12.9 g/m², retention: 6.9 g/g, swelling height after 10 minutes: 1.3 mm, swelling height per 100 g: 8.5 mm.

Example 15

The procedure was as in Example 13, but the polymer consisted of 10 mole-% acrylic acid, 10 mole-% sodium acrylate and 80 mole-% acrylamide, the viscosity was 17,000 mPa•s, and the batch concentration was 22 wt.-%. The properties were as follows: dry coating: 12.7 g/m², retention: 9.7 g/g, swelling height after 10 minutes: 1.3 mm, swelling height per 100 g: 10.2 mm.

Example 16

Starting from an aqueous 30 wt.-% solution of a polyacrylic acid (21,200 mPa•s) which was 50 mole-% neutralized with sodium hydroxide solution, a swelling paste was produced using 3 wt.-% of Imbetin SOR/060, which exhibited the following properties after coating on fabric and crosslinking (2 minutes, 190° C.): dry coating: 9.2 g/m², retention: 50.3 g/g, swelling height after 10 minutes: 1.6 mm, swelling height per 100 g: 17.4 mm.

Example 17

Example 16 was repeated, with the proviso that the crosslinker was added within 1 hour at 90° C. Dry coating: 19 g/m², retention: 21 g/g, swelling height after 10 minutes: 1.9 mm, swelling height per 100 g: 10 mm.

Example 18

1.4 wt.-% of 1,4-butanediol and 2.4 wt.-% of pentaerythritol were added to the polymer solution of Example 2 within one 1 hour. After crosslinking (2 minutes, 190° C.), the following properties were measured: dry coating: 17.6 g/m², retention: 23.5 g/g, swelling height after 10 minutes: 2.15 mm, swelling height per 100 g: 12.2 mm.

Example 19

The procedure was as in Example 5, but instead of the polyester fabric, a polyimide film (50 μm in thickness) was used as substrate and imprinted. The imprinted film was heated at 195° C. for 2 minutes in a drying oven. The product had a dry coating of 16 g/m² and a swelling height of 1.95 mm after 30 seconds, 1.99 mm after 1 minute, and 2.12 mm after 10 minutes. The 10 minute value per 100 g of dry coating was 13.2 mm/100 g, the retention was 48 g/g of dry coating.

Comparative Example 1

Isobam 10 (maleic acid/isobutylene copolymer) was saponified using water and sodium hydroxide solution as described in Example 3 of EP 361,842 A2. Subsequently, the saponified product was stirred with the indicated amount of butanediol and pentaerythritol at 90° C. for one hour and then printed on a polyester fabric. Crosslinking was performed at 190° C. for 2 minutes. The following properties were obtained: dry coating: 30.3 g/m², retention: 8.9 g/g, swelling height after 10 minutes: 1.3 mm, swelling height per 100 g: 4.2 mm.

Comparative Examples 2–5

The procedure was as in Example 1, except that the polyacrylic acid had neutralization degrees of 3.5 wt.-%, 25 wt.-%, 75 wt.-%, and 100 wt.-%. The swelling height and retention of each product were determined.

| Comparative Example | Neutralization degree (%) | Swelling height after 10 min (mm) | Swelling height per 100 g (mm) | Retention (g/g) |
| --- | --- | --- | --- | --- |
| 2 | 3.5 | 0.96 | 5.8 | 0.4 |
| 3 | 25 | 0.81 | 4.9 | 0 |
| 4 | 75 | 0.53 | 3.2 | 0.3 |
| 5 | 100 | 1.40 | 8.5 | 0 |

Example 20

The final mixture of Example 5 was stored for six months and re-measured: viscosity: 10,200 mPa•s. The product was printed as in Example 5. Dry coating: 16.6 g/m², swelling height after 30 seconds: 2.05 mm, after one minute: 2.11 mm, and after 10 minutes: 2.10 mm. The 10 minute value per 100 g of dry coating was 12.7 mm/100 g. The retention was 30 g/g of polymer.

Comparative Example 6

According to the teaching of EP 357,474, a polyacrylic acid, TS 30%, pH 5.0, viscosity 250 mPa•s, was stirred with 4 wt.-% of iron(II) sulfate, based on WS. When storing at room temperature, the product exhibited a viscosity of 1,400 mPa•s after only 6 hours, and more than 100,000 mPa•s after 24 hours. Having such a viscosity, the product can no longer be sprayed as indicated.

Comparative Example 7

According to the teaching of DE 195 21 431, a completely neutralized, poly(sodium acrylate) slightly crosslinked with TMPTA was produced: TS 30%, viscosity 22,700 mPa•s. This product was stirred with 1.5 wt.-% of ethylene glycol bisglycidyl ether, and the change in viscosity was determined. After storing for one hour at room temperature, the product already had a viscosity of 27,000 mPa•s. After a 24 hours storage at room temperature, the product was compact, so that the viscosity could not be determined anymore and processing was made impossible.

We claim:

1. A swelling paste, comprising an aqueous mixture of a water-soluble polymer containing carboxyl groups, and at least one multifunctional alcohol and optionally further additives, characterized in that the carboxyl groups of the water-soluble, carboxyl group-containing polymer are neutralized to 40–65 mole-%, and the multifunctional alcohol is present at a concentration of from 0.5 to 30 wt.-%, based on the weight of polymer employed.

2. The swelling paste of claim 1, characterized in that the polymer is made up of at least 50 mole-% of monomers containing carboxyl groups.

3. The swelling paste according to one of claims 1 to 2, characterized in that the carboxyl group-containing polymer is made up of carboxyl group-containing monomers and other, water-soluble comonomers.

4. The swelling paste according to claim 1, characterized in that the carboxyl group-containing monomers constituting the carboxyl group-containing polymer are selected from the group consisting of acrylic acid, methacrylic acid, maleic acid, maleic anhydride, fumaric acid, and itaconic acid.

5. The swelling paste according to claim 1, characterized in that the water-soluble comonomers constituting the carboxyl group-containing polymer are selected from the group of acrylamide, methacrylamide, hydroxyethyl acrylate, allylsulfonic acid, methallylsulfonic acid, and acrylamidopropanesulfonic acid.

6. The swelling paste according to claim 1, characterized in that the carboxylate groups of the polymer are formed using Na, K, ammonium, alkylammonium, and alkanolammonium counterions.

7. The swelling paste according to claim 1, characterized in that the multifunctional alcohols are selected from the group of ethylene glycol, propylene glycol, glycerol, butanediol, trimethylolpropane, erythritol, pentaerythritol, and hydrogenated sugars.

8. The swelling paste according to claim 1, characterized in that the multifunctional alcohols are alkoxylated.

9. The swelling paste according to claim 1, characterized in that the multifunctional alcohols are ethoxylated using at least 1 mol of ethylene oxide per mol alcohol.

10. The swelling paste according to claim 1, characterized in that the multifunctional alcohol is an alkoxylation product of an amine and/or amino alcohol.

11. The swelling paste according to claim 1, characterized in that the neutralization degree of the carboxyl groups is from of 45 to 60 mole-%.

12. The swelling paste according to claim 1, characterized in that the multifunctional alcohol is present at a concentration of from 1 to 20 wt.-%, based on polymer employed.

13. The swelling paste according claim 1, further comprising thickeners, plasticizers, fillers and dyes.

14. The swelling paste according to claims 1, characterized in that the viscosity of a 30 wt.-% aqueous solution of the polymer employed is not below a value of 800 mPa•s and not above a value of 25,000 mPa.s.

15. The swelling paste according to claim 1, characterized in that it has a swelling height per 100 g of at least 8 mm after drying and crosslinking post-cure at 150–250° C.

16. The swelling paste according to claim 1, characterized in that it has a retention of at least 15 g/g dry weight after drying and crosslinking post-cure at 150–250° C.

17. A method for producing water-swellable yarns, fabrics, nonwovens or films, comprising:

coating the swelling paste according to claim 1 on a support, followed by a subsequent thermal treatment to dry and crosslink.

18. The method according to claim 17, characterized in that the thermal subsequent treatment is effected within a range of from 150° C. to 250° C. when coating on a support.

19. The method according to claim 17, characterized in that the thermal subsequent treatment is effected at temperatures of up to 400° C. when coating on thermally stable supports.

20. The method according to claim 17, characterized in that in the production of a water-swellable film, the swelling paste is initially coated on a preferably reusable intermediate support, from which the film is removed after crosslinking and optional further conditioning.

* * * * *